United States Patent
Ishitaka

(10) Patent No.: US 6,806,922 B2
(45) Date of Patent: Oct. 19, 2004

(54) SURFACE LIGHT-EMITTING DEVICE HAVING LIGHT-GUIDE PANEL WHEREIN LIGHT RADIATED FROM EXIT SURFACE IS MAXIMIZED PROXIMATE TO NORMAL DIRECTION OF EXIT SURFACE

(75) Inventor: Yoshihiko Ishitaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 8 days.

(21) Appl. No.: 10/200,940

(22) Filed: Jul. 23, 2002

(65) Prior Publication Data

US 2003/0025852 A1 Feb. 6, 2003

(30) Foreign Application Priority Data

Jul. 27, 2001 (JP) ........................................ 2001-228645

(51) Int. Cl.[7] ........................... G02F 1/1335; F21V 7/04
(52) U.S. Cl. ............................. 349/62; 349/63; 349/65; 349/113; 362/31
(58) Field of Search ............................ 349/62, 65, 63, 349/113; 362/31

(56) References Cited

U.S. PATENT DOCUMENTS

| | | | |
|---|---|---|---|
| 6,104,453 A | 8/2000 | Watanabe | 349/61 |
| 6,199,995 B1 * | 3/2001 | Umemoto et al. | 362/31 |
| 6,266,108 B1 * | 7/2001 | Bao et al. | 349/63 |
| 6,323,919 B1 * | 11/2001 | Yang et al. | 349/63 |
| 2002/0114150 A1 * | 8/2002 | Nakamura | 362/3.1 |

FOREIGN PATENT DOCUMENTS

| | | | |
|---|---|---|---|
| EP | 0 621 500 | * | 10/1994 |
| EP | 0 823 587 | * | 2/1998 |
| EP | 0 879 991 | * | 11/1998 |
| WO | WO 99/22268 | * | 5/1999 |

* cited by examiner

Primary Examiner—Tarifur R. Chowdhury
(74) Attorney, Agent, or Firm—Brinks Hofer Gilson & Lione

(57) ABSTRACT

A liquid crystal display device includes a surface light-emitting device. The surface light-emitting device includes a light source and a light guide panel having a light incident surface provided on an end surface thereof for introducing light from the light source and an exit surface from which the light is radiated. The light guide panel includes a reflecting surface which faces the exit surface and which is provided with a plurality of grooves formed sequentially in a stripe pattern, each of the grooves having a gentle slope and a steep slope whose slope angle is steeper than that of the gentle slope. The direction in which the amount of light radiated from the exit surface of the light guide panel is maximized defines an angle of 1° to 10° with respect to the normal line of the exit surface.

16 Claims, 11 Drawing Sheets

SURFACE LIGHT-EMITTING DEVICE HAVING LIGHT-GUIDE PANEL WHEREIN LIGHT RADIATED FROM EXIT SURFACE IS MAXIMIZED PROXIMATE TO NORMAL DIRECTION OF EXIT SURFACE

BACKGROUND OF THE INVENTION

1. Field of the Invention

The present invention relates to a surface light-emitting device and a liquid crystal display device.

2. Description of the Related Art

Hitherto, in reflective liquid crystal display devices using ambient light as a light source, the brightness depends on the amount of ambient light, and thus the display visibility significantly deteriorates in circumstances where a sufficient amount of ambient light cannot be obtained, such as in dark places.

In order to overcome this problem, a liquid crystal display device in which a front light (surface light-emitting device), functioning as an auxiliary light source, is provided on the front surface of a reflective liquid crystal display unit has been proposed. This type of liquid crystal display device including the front light operates as an ordinary reflective liquid crystal display device in circumstances where sufficient ambient light can be obtained, such as outdoors during daytime. Also, the front light can be used as a light source as required. FIG. 12 is a sectional view showing an example of a liquid crystal display device provided with a front light on the front surface of a liquid crystal display unit. The liquid crystal display device 200 shown in FIG. 12 includes a liquid crystal display unit 220 and a front light 210. The front light 210 is placed on the front surface (upper surface in FIG. 12) of the liquid crystal display unit 220 so that a light guide panel 212 is placed in the display area of the liquid crystal display unit 220.

The front light 210 includes the light guide panel 212, which is made by injection molding of a transparent acrylic resin or the like, and a light source 213 comprising a cold-cathode tube or the like provided on an end surface 212a of the light guide panel 212. The lower surface (the liquid crystal display unit 220 side) of the light guide panel 212 is an exit surface 212b from which light is emitted. The surface facing the exit surface 212b (the upper surface of the light guide panel 212) is a reflecting surface 212c provided with a first slope 214a formed to incline with respect to the exit surface 212b so as to change the direction of light inside the light guide panel 212 and a second slope 214b which is continuous with the first slope 214a, the first and second slopes 214a and 214b being repeatedly placed one after another.

The liquid crystal display unit 220 includes a first substrate 221 and a second substrate 222, which face each other with a liquid crystal layer 223 therebetween, and a sealing material 224 for joining the first substrate 221 and the second substrate 222. On the liquid crystal layer 223 side of the first substrate 221, a reflecting layer 230 including an organic film 228 and a reflecting film 225, which is formed on the organic film 228 and which reflects incoming light, and a display circuit 226 for driving and controlling the liquid crystal layer 223 are laminated in this order. Also, a display circuit 227 is formed on the liquid crystal layer 223 side of the second substrate 222. As shown in FIG. 12, the upper surface (the surface on the liquid crystal layer 223 side) of the organic film 228 is uneven so that the light reflected by the reflecting film 225 formed on the surface of the organic film 228 is diffused.

In the liquid crystal display device 200 having the above-described configuration, light from the light source 213 enters the light guide panel 212 via the end surface 212a of the light guide panel 212, passes through the light guide panel 212, is reflected at the first slope 214a having the larger slope angle with respect to the light guide direction, the direction of the light is changed toward the exit surface 212b, and the light is radiated from the exit surface 212b. The light from the exit surface 212b enters the liquid crystal display unit 220 as illuminating light, passes through the display circuits 226 and 227 and the liquid crystal layer 223, is reflected by the reflecting film 225, returns to the outside of the liquid crystal display unit 220, passes through the exit surface 212b and the reflecting surface 212c of the light guide panel 212, and reaches the user. In this way, the display of the liquid crystal display unit 220 is seen by the user.

The liquid crystal display device 200 having the above-described configuration can be used even in dark places, where ambient light cannot be used, by turning on the front light 210 as required. However, when display brightness using ambient light as a light source is compared to the display brightness using the front light 210, the display brightness using the front light 210 is lower. Accordingly, when display is performed by switching on/off the front light, the display is difficult to see due to the difference in brightness, and therefore the device is not user-friendly.

SUMMARY OF THE INVENTION

The present invention has been made to solve the above-described problems, and it is an object of the present invention to provide a surface light-emitting device which has a high luminance and a good brightness distribution in the display, and which is preferably provided on the front surface of a reflective liquid crystal display unit.

Also, it is another object of the present invention to provide a liquid crystal display device having a surface light-emitting device in which a bright display can be realized when the surface light-emitting device is either on or off and an excellent visibility can be realized.

The above-described reflective liquid crystal display device 200 including the front light 210 is used for a display unit of mobile phones and mobile information terminals. The liquid crystal display device incorporated into such electronic equipment is often used so that the direction of an external light source and the direction of the line of sight of a user receiving the reflection light from the liquid crystal display device 200 are in a specific range. This will be described below with reference to FIGS. 12 and 13.

FIG. 13 is a side view showing an example of a mobile phone including the above-described liquid crystal display device 200 as a display unit. The mobile phone 250 shown in this figure includes an operation unit 260 and a display unit 270. The operation unit 260 and the display unit 270 are coupled to each other by a hinge 280 provided therebetween and the display unit 270 can be opened and closed with respect to the operation unit 260, with the hinge 280 being a supporting point. A plurality of operation buttons 261 are provided on the inner side of the operation unit 260 and the liquid crystal display device 200 is provided on the inner side of the display unit 270. When used, the display unit 270 is opened, with the hinge 280 acting as a supporting point, as shown in FIG. 13, so that the liquid crystal display device 200 provided on the inner side of the display unit 270 can be seen by the user.

The liquid crystal display device 200 provided in the mobile phone 250 shown in FIG. 13 performs display by allowing the reflecting layer 230 of the liquid crystal display unit 220 to reflect incoming light Q entering at a predetermined angle with respect to the normal line P of the liquid crystal display device 200, when the external light is used as a light source. At that time, the user U is often located a little away from the normal line P of the liquid crystal display device 200 (the operation unit 260 side) as shown in FIG. 13. Accordingly, the inventors of the present invention have found that the direction of reflection light Q' generated by specularly reflecting the incoming light Q should substantially correspond with the direction of the line of sight of the user U in order to make the display brighter in the direction of the line of sight of the user U.

The inventors have studied the luminance characteristic of a surface light-emitting device for improving the visibility of the liquid crystal display device based on the above-described knowledge and have completed the present invention.

That is, according to an aspect of the present invention, a surface light-emitting device comprises a light source; and a light guide panel having a light incident surface provided on an end surface thereof that introduces light from the light source and an exit surface from which the light is radiated. The direction in which the amount of light radiated from the exit surface of the light guide panel is maximized defines an angle of 1° to 10° with respect to the normal line of the exit surface.

With this configuration, when the surface light-emitting device of the present invention is provided on the front surface of a reflective liquid crystal display unit so as to constitute a liquid crystal display device, the amount of reflection light in the direction of the line of sight of a user can be maximized. That is, the light from the surface light-emitting device is radiated at an angle of 1° to 10° with respect to the normal line of the exit surface, and thus the incident angle of light entering the reflector provided in the liquid crystal display unit is also 1° to 10°. Accordingly, the angle of specular reflection light with respect to the incoming light is also 1° to 10°, and the amount of the light radiated from the liquid crystal display unit is maximized in the direction defining an angle of 1° to 10° with respect to the direction perpendicular to the liquid crystal display unit. Since this direction substantially corresponds to the direction of the line of sight of the user, the brightness of the liquid crystal display device is maximized in the direction of the line of sight of the user, and thus a bright display can be achieved.

Also, by enhancing the brightness when the surface light-emitting device is in the on state, the difference in the brightness in a state where display is performed by using external light (when the surface light-emitting device is in the off state) becomes small. Accordingly, the surface light-emitting device can be preferably used by switching it on/off.

Preferably, the light guide panel has the luminance characteristic in that the luminance is maximized in the direction defining an angle of 3° to 8° with respect to the normal line of the exit surface.

With this arrangement, in the liquid crystal display device including the surface light-emitting device of the present invention as an illuminating unit, the direction of reflection light can be brought closer to the direction of the line of sight of the user, and thus a brighter display can be obtained.

According to another aspect of the present invention, a surface light-emitting device comprises a light source; and a light guide panel having a light incident surface provided on an end surface thereof for introducing light from the light source and an exit surface from which the light is radiated. The light guide panel comprises a reflecting surface which faces the exit surface and which is provided with a plurality of grooves formed sequentially in a stripe pattern, each of the grooves having a gentle slope and a steep slope whose slope angle is steeper than that of the gentle slope. The slope angle of the gentle slope is 1.8° to 2.5°, the pitch of the grooves is 140 μm to 240 μm, and the slope angle of the steep slope is 43° to 47°.

By setting the slope angle of the steep slope to 43° to 47°, the direction in which the amount of light from the surface light-emitting device is maximized can be set in the range of 1° to 10° with respect to the normal line of the exit surface, and thus the illuminated liquid crystal display unit can efficiently reflect the light. Therefore, a liquid crystal display device which performs a bright display and which is excellent in visibility can be provided. When the slope angle of the steep slope is less than 43°, the angle defined by the direction in which the luminance of the surface light-emitting device is maximized and the normal line of the exit surface becomes less than 1°, and thus an effect for realizing a bright display cannot be obtained. Also, when the slope angle of the steep slope is more than 47°, the angle defined by the direction in which the amount of the radiated light is maximized and the normal line of the exit surface becomes too large, and thus a bright display cannot be realized.

The slope angle of the gentle slope of the light guide panel is 1.8° to 2.5°. If the slope angle of the gentle slot is less than 1.8°, the amount of light from the surface light-emitting device is reduced and the brightness of the liquid crystal display device is reduced accordingly. Also, when the slope angle is more than 2.5°, the distribution of radiated light over the exit surface of the surface light-emitting device becomes nonuniform, and thus the brightness distribution of the liquid crystal display device is deteriorated, which is not preferable.

The pitch of the groove of the light guide panel is 140 μm to 240 μm. If the pitch of the groove is less than 140 μm, the amount of light radiated from the exit surface of the surface light-emitting device is reduced, and the brightness of the liquid crystal display device is reduced accordingly. Also, when the pitch of the groove is more than 240 μm, emission lines are generated in the light guide panel of the surface light-emitting device and the visibility of the liquid crystal display device is disadvantageously deteriorated.

According to another aspect of the present invention, a liquid crystal display device comprises the above-described surface light-emitting device. With this arrangement, the amount of radiated light in the direction of the line of sight of the user can be increased by the surface light-emitting device having the above-described characteristic, and thus the liquid crystal display device for performing a bright display can be realized.

The liquid crystal display device may further comprise a liquid crystal display unit including a pair of substrates sandwiching a liquid crystal layer. The surface light-emitting device is provided on the front surface of the liquid crystal display unit. The liquid crystal display unit includes a reflector that reflects light from the outer side of one of the substrates. The direction in which the amount of reflection light reflected by the reflector is maximized defines an angle of 1° to 10° with respect to the normal line of the liquid crystal display unit when the surface light-emitting device is in the on state.

Preferably, the direction in which the amount of reflection light reflected by the reflector is maximized defines an angle of 3° to 8° with respect to the normal line of the liquid crystal display unit when the surface light-emitting device is in the on state.

With this configuration, the liquid crystal display device in which the brightness in the direction of the line of sight of the user using the liquid crystal display device is enhanced can be realized, and the liquid crystal display device for performing a bright display can be realized.

The reflector may have a surface provided with a plurality of reflective concavities formed irregularly and sequentially. With this arrangement, the reflection efficiency of the reflector can be increased and thus the liquid crystal display device for performing a brighter display can be realized.

The reflector may be provided on the back side of the liquid crystal display unit. Accordingly, a liquid crystal display unit of an arbitrary form and the reflector can be combined.

Further, the reflector may be incorporated into the liquid crystal display unit. With this configuration, the path of the light entered the liquid crystal display unit and reaching the reflector can be shortened, and thus a bright display can be realized while suppressing a loss of light.

Note that in the present specification, the numerical values presented, unless otherwise specified as exactly those values, are approximate, e.g. "140 $\mu$m" is "about 140 $\mu$m" unless specified as "exactly 140 $\mu$m". Similarly, each range is indicated as "x to y." Such a range represents "about x to about y" unless otherwise designated as exactly using the particular values. For example, the range of 140 $\mu$m to 240 $\mu$m is about 140 $\mu$m to 240 $\mu$m. Additionally, from time to time "about" may also be used as prefixes to values or ranges, but are merely present to remind the reader that these numbers are approximate as long as the desired characteristics are obtained.

DESCRIPTION OF THE PREFERRED EMBODIMENTS

Hereinafter, embodiments of the present invention will be described with reference to the drawings. However, the present invention is not limited to the following embodiments.

(First Embodiment)

Figure 1:
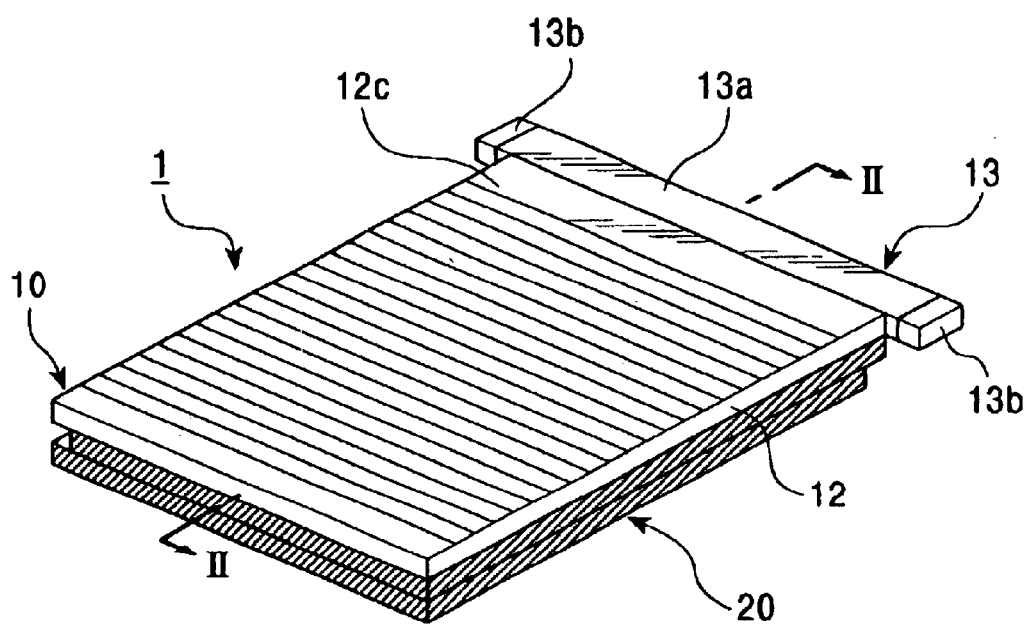
FIG. 1 is a schematic perspective view showing a liquid crystal display device including a surface light-emitting device according to a first embodiment of the present invention.
Figure 2:
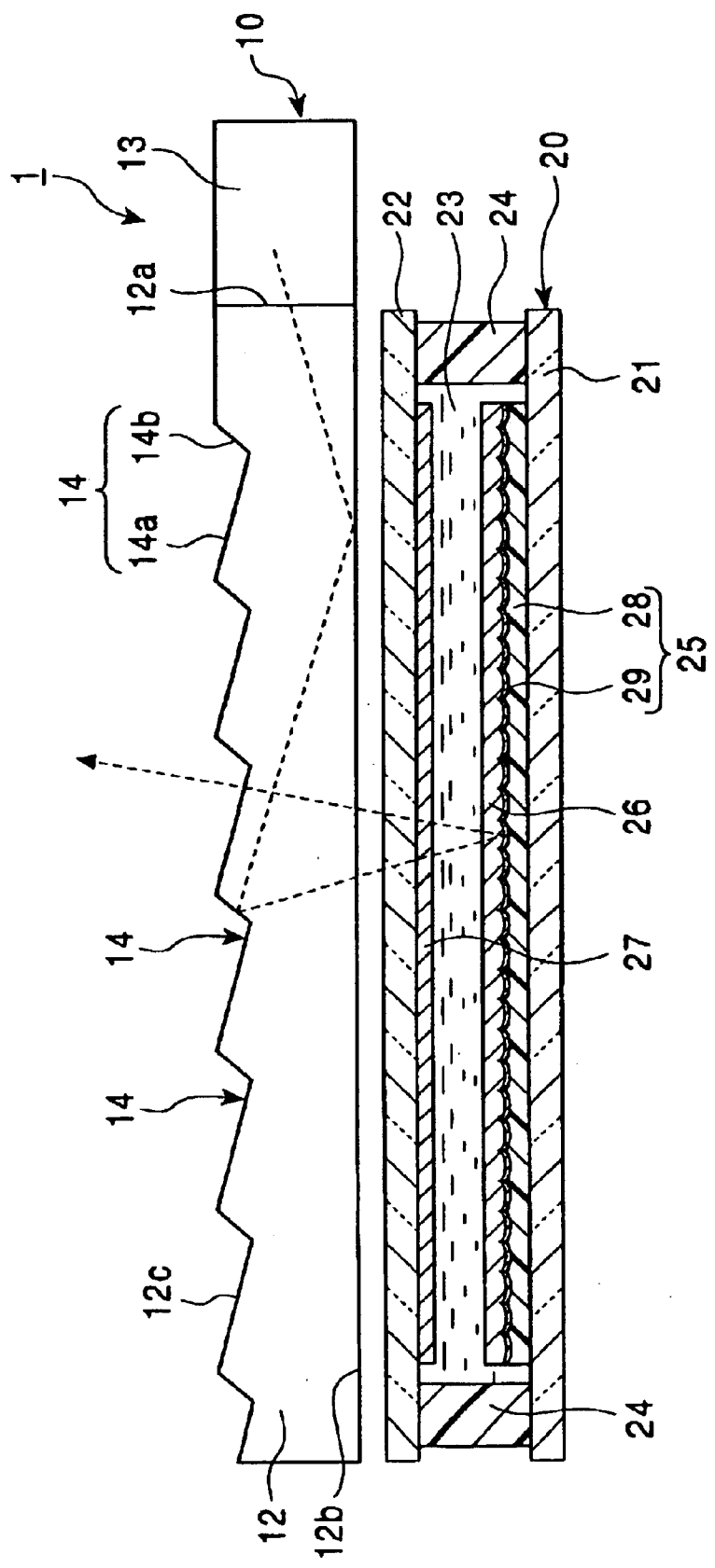
FIG. 2 is a sectional view of the liquid crystal display device shown in FIG. 1.

FIG. 1 is a perspective view showing a liquid crystal display device including a front light (surface light-emitting device) according to a first embodiment of the present invention and FIG. 2 is a sectional view of the liquid crystal display device shown in FIG. 1. The liquid crystal display device 1 shown in FIGS. 1 and 2 includes a liquid crystal display unit 20 and a front light 10, which is provided on the front surface of the liquid crystal display unit 20 for illuminating the liquid crystal display unit 20. The front light 10 includes a transparent light guide panel 12 and a light source 13. The light source 13 is provided on an end surface 12a from which light enters the light guide panel 12.

The light guide panel 12 is placed on the front side (upper side in FIG. 2) of a display area of the liquid crystal display unit 20 so as to guide light from the light source 13 to the liquid crystal display unit 20. The light guide panel 12 comprises a transparent flat acrylic resin or the like. As shown in FIG. 2, the light source 13 is provided on the end surface 12a of the light guide panel 12 so that light from the light source 13 enters the light guide panel 12 via the end surface 12a. The lower surface of the light guide panel 12 (the surface on the liquid crystal display unit 20 side) is an exit surface 12b from which the light for illuminating the liquid crystal display unit 20 is emitted. The upper surface opposite to the exit surface 12b (the external surface of the light guide panel 12) is a reflecting surface 12c for changing the direction of light transmitted through the inside of the light guide panel 12.

As the material of the light guide panel 12, a transparent resin such as a polycarbonate resin or an epoxy resin, glass, or the like can be used as well as an acrylic resin. Preferable specific examples are, although not limited to, ARTON (trade name, made by JSR Corporation) and Zeonor (trade name, made by ZEON Corporation).

The exit surface 12b of the light guide panel 12 is provided so as to face the liquid crystal display unit 20 and emits the light for illuminating the liquid crystal display unit 20. Also, the exit surface 12b is a smooth surface having a surface roughness (Ra) of 10 nm or less. In the reflecting surface 12c, a plurality of wedge-like grooves 14 are formed in a stripe pattern at a predetermined pitch in order to change the direction of the light transmitted through the light guide panel 12 by reflecting the light. Each of the grooves 14 includes a gentle slope 14a formed at an incline with respect to the exit surface 12b and a steep slope 14b which is continuous with the gentle slope 14a and which is formed with a slope angle larger than that of the gentle slope 14a. The edges of the light guide panel 12 that form the gentle slope 14a and steep slope 14b, as well as the plane that connects the apex of the grooves that bound the gentle slope 14a and steep slope 14b, form a scalene triangle.

The formation direction of each of the grooves 14 is parallel to the end surface 12a of the light guide panel 12. In the front light 10 according to this embodiment, the plurality of grooves 14 provided in the reflecting surface 12c of the light guide panel 12 have a form described below. Hereinafter, the form of each of the grooves 14 will be described with reference to FIGS. 3A and 3B.

Figure 3A:
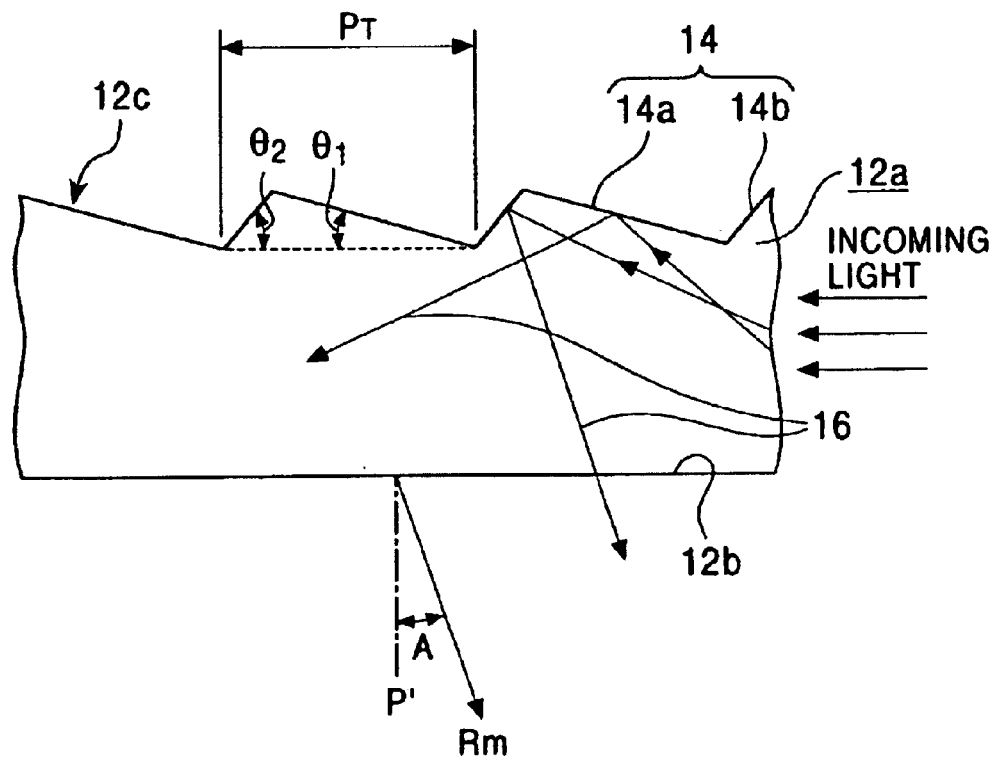
FIG. 3A is an enlarged side view of a part of a light guide panel of the light-emitting device according to the present invention.
Figure 3B:
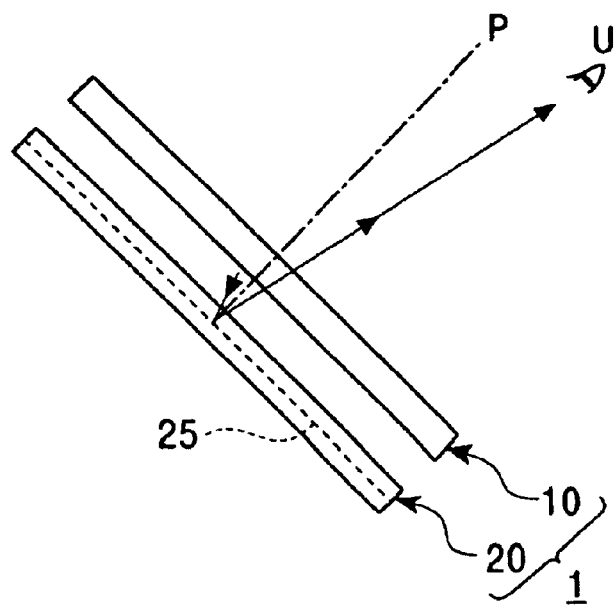
FIG. 3B is for illustrating a path of the light emitted from the surface light-emitting device and reaching the user.

FIG. 3A is an enlarged side view of a part of the light guide panel 12 shown in FIG. 2. FIG. 3B is for illustrating a path of the light emitted from the front light 10 and reaching the user. Light 16 transmitted through the light guide panel 12 shown in FIG. 3A is emitted from the light source (not shown) provided on the right side in the figure and is transmitted through the light guide panel 12, with the light being reflected at the inner surface of the light guide panel 12.

Each of the grooves 14 formed in a stripe-pattern in the reflecting surface 12c of the light guide panel 12 shown in FIG. 3A includes the gentle slope 14a and the steep slope 14b. The slope angle $\theta_1$ of the gentle slope 14a is 1.8° to 2.5° with respect to the exit surface 12b and the slope angle $\theta_2$ of the steep slope 14b is 43° to 47° with respect to the exit surface 12b. Further, the pitch PT of the grooves 14 is 140 $\mu$m to 250 $\mu$m. The reason for the slope angles $\theta_1$ and $\theta_2$ and the pitch PT being in this range is described above.

The amount of light from the exit surface 12b can be made uniform over the exit surface 12b by controlling the slope angles $\theta_1$ and $\theta_2$ and the pitch PT in the above range. Also, a front light in which emission lines are not generated in the reflecting surface 12c side of the light guide panel 12 can be realized. Furthermore, as shown in FIG. 3A, the angle A defined by the direction Rm in which the amount of light from the exit surface 12b of the front light 10 is maximized and the normal line P' of the exit surface 12b is more than 0° and 10° or less (0°<A≦10°).

Accordingly, as shown in FIG. 3B, the light from the front light 10 is reflected at a reflecting layer 25 of the liquid crystal display unit 20 and then reaches the user U. In the front light 10 according to the present invention, the angle defined by the direction Rm in which the amount of emitted light is maximized and the normal line P is within the above-described range, and thus the amount of light can be maximized in the direction of the line of sight of the user U when the light is specularly reflected at the reflecting layer 25. That is, a bright display can be achieved in the positioning relationship between the user U and the liquid crystal display device 1 when used.

As shown in FIG. 1, the light source 13 includes a prismatic-shaped light guide unit 13a comprising acrylic resin, polycarbonate resin, or the like and light-emitting elements (white LED) 13b provided at both ends in the longitudinal direction of the light guide unit 13a. Among side surfaces of the light guide unit 13a, a side surface facing the light guide panel 12 is provided with a prism surface (not shown). The prism surface reflects light entering the light guide unit 13a from the light-emitting elements 13b and changes the transmitting direction of the light to the light guide panel 12 side so that the light from the light-emitting elements 13b is radiated to the end surface 12a of the light guide panel 12.

In this embodiment, the light-emitting elements 13b, including LEDs, are used as the light source 13. However, a cold-cathode tube or an organic EL element can be used for the light emitting element. Indeed, any light-emitting element can be used as long as light can be radiated uniformly over the end surface 12a of the light guide panel 12.

The liquid crystal display unit 20 includes a first substrate 21 and a second substrate 22, which comprise glass and face each other with a liquid crystal layer 23 therebetween, and a sealing material 24 for joining the first substrate 21 and the second substrate 22. On the liquid crystal layer 23 side of the first substrate 21, a reflecting layer (reflector) 25 including an organic film 28 and a metallic reflecting film 29, which is formed on the organic film 28 and which reflects incoming light, and a display circuit 26 are laminated in this order. Also, a display circuit 27 is formed on the liquid crystal layer 23 side of the second substrate 22. The liquid crystal display unit 20 is a reflective liquid crystal display unit including the reflecting layer 25 for reflecting the light from the outside.

Each of the display circuits 26 and 27 includes an electrode layer (not shown) comprising a transparent conductive film or the like for driving the liquid crystal layer 23 and an orientation film (not shown) for controlling the orientation of the liquid crystal layer 23. Depending on the circumstances, the circuits may include a color filter for performing color display.

The reflecting layer 25 includes the organic film 28 comprising an acrylic resin or the like having an uneven surface and the reflecting film 29 comprising a metallic film having a high reflectivity, such as aluminum or silver, formed on the organic film 28 by sputtering or the like. Alternatively, metal is not the only material from which the reflection film 29 may be fabricated; any material may be used that has similar reflectance/transmittance characteristics as metal with the desired thickness for light within the desired wavelength range (usually visible 400 nm–800 nm). In addition, a planarizing film comprising a silicone resin or the like can be formed so as to cover the reflecting film 29 and the organic film 28.

The reflecting layer 25 may include a color filter. In that case, it is preferable to form the color filter right above the reflecting film 29. With this configuration, the color filter can be placed on a light-reflecting surface, and thus high-quality color display can be realized while reducing color drift and parallax.

Figure 4:
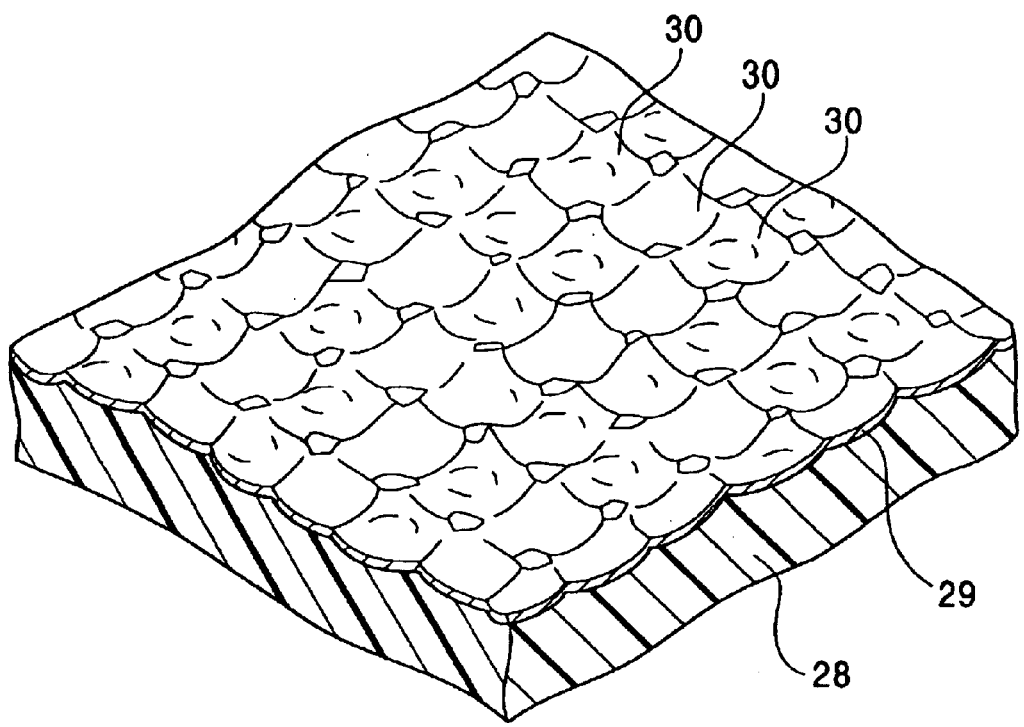
FIG. 4 is an enlarged perspective view of a part of the reflecting layer shown in FIG. 2.

Now, an example of the form of the organic film 28 and the reflecting film 29 formed on the surface thereof will be described with reference to FIGS. 4 to 7. FIG. 4 is an enlarged perspective view showing a part of the organic film 28 and the reflecting film 29. In the reflecting film 29 shown in this figure, many concavities 30 are irregularly formed adjoining each other. The organic film 28 can be fabricated by evenly forming a resin layer comprising a photosensitive resin or the like on a substrate, pressing a transfer mold comprising an acrylic resin having a negative convex-concave surface with respect to the surface of the organic film 28 shown in FIG. 4 to the surface of the resin layer, and then by curing the resin layer. The reflecting film 29 is formed on the surface of the organic film 28 and reflects light entering the liquid crystal display unit 20. The reflecting film 29 can be formed by a metallic material having a high reflectivity, such as aluminum or silver, with a film-forming method such as sputtering or vacuum evaporation.

Figure 5:
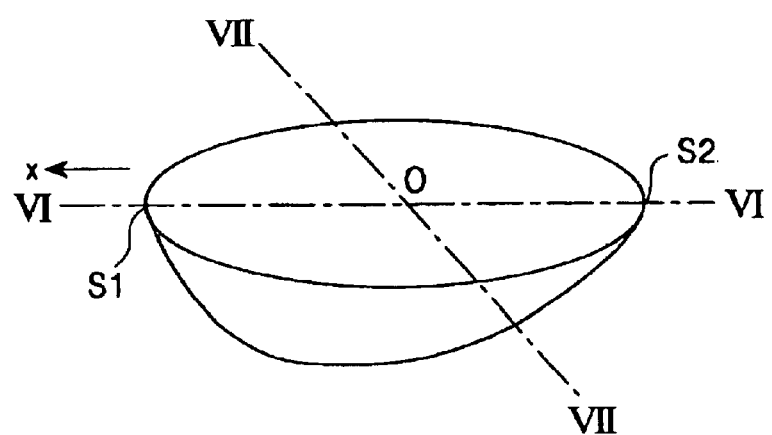
FIG. 5 is a perspective view showing one of concavities shown in FIG. 4.
Figure 6:
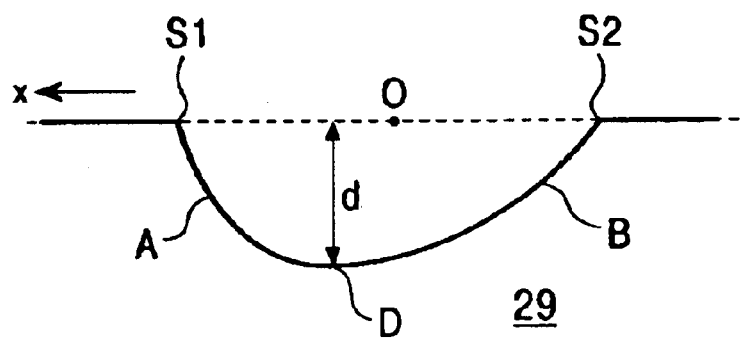
FIG. 6 is a sectional view taken along the line VI—VI of the concavity shown in FIG. 5.
Figure 7:
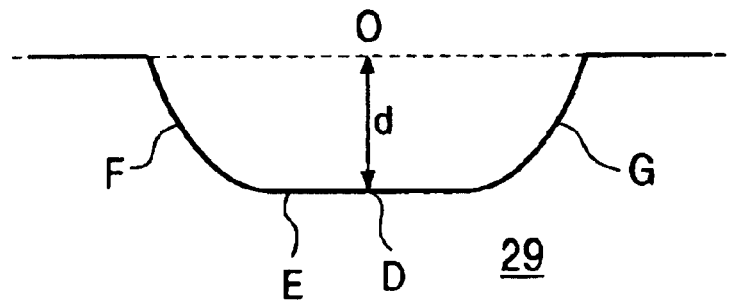
FIG. 7 is a sectional view taken along the line VII—VII of the concavity shown in FIG. 5.

The inner form of one of the concavities 30 is shown in FIGS. 5 to 7. FIG. 5 is a perspective view of the concavity 30 shown in FIG. 4, FIG. 6 is a sectional view of the concavity 30 taken along the line VI—VI in FIG. 5, and FIG. 7 is a sectional view of the concavity 30 taken along the line VII—VII, which is orthogonal to the line VI—VI.

As shown in FIG. 6, the internal surface along the line VI—VI of the concavity 30 is defined by a first curve A extending from one peripheral point S1 to the deepest point D of the concavity 30 and a second curve B extending from the deepest point D to another peripheral point S2 of the concavity 30, the first and second curves being continuous. In FIG. 6, the downward-sloping first curve A and the upward-sloping second curve B are smoothly continuous, the slope angle of the two curves with respect to the surface of the reflecting film 29 being zero at the deepest point D.

Herein, the "slope angle" refers to an angle defined by a tangent at an arbitrary point in the inner surface of the concavity 30 and a horizontal surface (for example, the surface of the substrate 21) in a specific longitudinal section.

The slope angle of the first curve A with respect to the surface of the reflecting film 29 is steeper than that of the second curve B. The deepest point D is located at a position deviating from the center O of the concavity 30 toward the direction x. That is, the average absolute value of the slope angle of the first curve A is larger than the average absolute value of the slope angle of the second curve B. The average absolute value of the slope angle of the first curve A in the concavities 30 is irregular within the range of 2° to 90°. Also, the average absolute value of the slope angle of the second curve B in the concavities 30 is irregular within the range of 1° to 89°.

On the other hand, as shown in FIG. 7, the inner surface along the line VII—VII of the concavity 30 is substantially symmetrical around the center O of the concavity 30. The vicinity of the deepest point D of the concavity 30 has a large radius of curvature, that is, it defines a shallow curve E which is close to a straight line. The right and left of the shallow curve E are deep curves F and G having a small radius of curvature, and the absolute value of the slope angle of the shallow curve E of the concavities 30 is about 10° or less. The absolute values of the slope angles of the deep curves F and G of the concavities 30 irregularly vary, for example, 2° to 90°. Further, the depth d of the deepest point D irregularly varies within the range of 0.1 µm to 3 µm in the concavities 30.

In the reflecting film 29 of this embodiment, each of the sections along the line VI—VI of the concavities 30 extends in the same direction. Likewise, each of the sections along the line VII—VII of the concavities 30 extends in the same direction. Further, each first curve A is formed along a single direction. That is, each of the concavities 30 is formed so that the x direction shown in FIGS. 5 and 6 is the same in every concavity 30.

Figure 8:
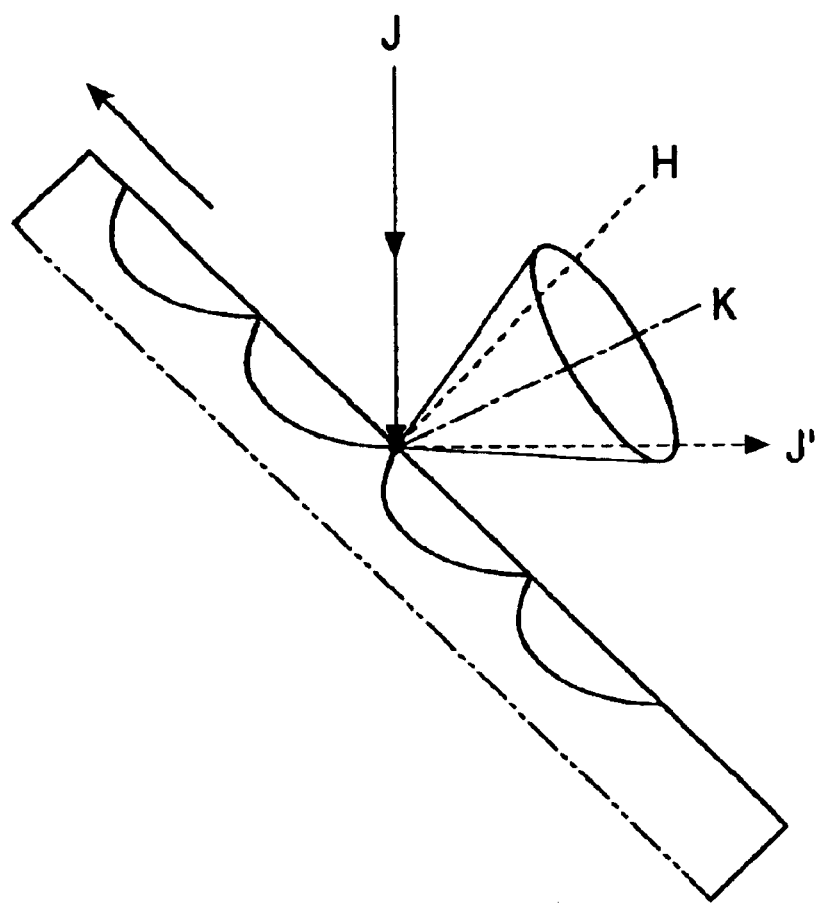
FIG. 8 is for illustrating the reflection characteristic of the reflecting layer shown in FIG. 4.

According to the reflecting film 29 of this embodiment, the first curve A of each concavity 30 extends in a single direction, and thus the reflection characteristic deviates from the direction of specular reflection at the surface of the liquid crystal display unit 20, as shown in FIG. 8. That is, as shown in FIG. 8, reflection light K, for blight display area, generated by light J coming obliquely from above in the x direction deviates from the specular reflection direction J' toward the normal line H of the liquid crystal display unit 20.

Further, the section taken along the line VII—VII, which is orthogonal to the line VI—VI, has the shallow curve E having a large radius of curvature and the deep curves F and G having a small radius of curvature on both sides of the shallow curve E. Accordingly, the reflectivity in the direction of specular reflection (direction of normal line H) at the liquid crystal display unit 20 can be enhanced.

Figure 9:
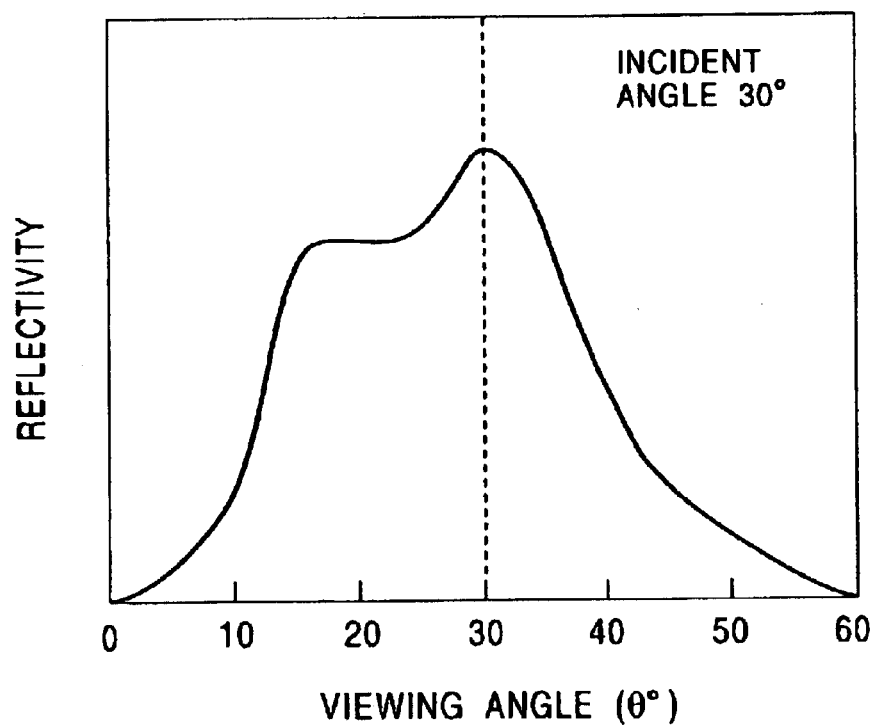
FIG. 9 is graph for indicating the viewing angle characteristic of the reflecting layer shown in FIG. 4, in which the horizontal axis indicates the viewing angle and the vertical axis indicates the reflectivity.

As a result, as shown by a solid curve in FIG. 9, with the overall reflection characteristic in the section taken along the line VI—VI, the reflection light can be moderately concentrated in a specific direction while ensuring a sufficient reflectivity in the direction of specular reflection. That is, FIG. 9 shows the relationship between the viewing angle (θ°) and the brightness (reflectivity or light intensity) in the case where the external light is radiated to the liquid crystal display device 1 according to this embodiment with an incident angle of 30° and the viewing angle is gradually changed from the perpendicular position (0°) to 60°, with 30° being the center, which is the direction of specular reflection with respect to the display surface. As seen in FIG. 8, the perpendicular position corresponds to the normal line of the display surface. As shown, the maximum reflectivity occurs in the specular reflection direction (in this case at a viewing angle of 30°) and a secondary peak in reflectivity occurs closer to the normal line than the specular reflection direction. Also as can be seen, the integrated intensity of light in angles less than the specular reflection angle is greater than the integrated intensity of light in angles greater than the specular reflection angle.

The liquid crystal display device 1 having the above-described configuration can perform reflective display using the light from the front light 10 as well as reflective display using ambient light, such as sunlight and environmental illumination.

The light radiated from the light source 13 of the front light 10 and entering the light guide panel 12 via the end surface 12a of the light guide panel 12 passes through the light guide panel 12, is reflected by the steep slope 14b forming the groove 14 provided in the reflecting surface 12c of the light guide panel 12, the transmission direction of the light is changed to the exit surface 12b side, and the light is radiated from the exit surface 12b of the light guide panel 12 so as to illuminate the liquid crystal display unit 20. The light entering the liquid crystal display unit 20 passes through the display circuits 26 and 27 and the liquid crystal layer 23 of the liquid crystal display unit 20 so as to reach the reflecting layer 25, is reflected by the reflecting film 29 of the reflecting layer 25 so as to return to the upper side of the liquid crystal display unit 20, passes through the light guide panel 12 so as to be radiated from the reflecting surface 12c, and then reaches the user. In this way, the display of the liquid crystal display unit 20 can be seen by the user.

Further, in the liquid crystal display device of this embodiment, the grooves 14 are formed in the reflecting surface 12c of the light guide panel 12 at the slope angles θ₁ and θ₂ and the pitch PT. Accordingly, the direction in which the amount of light radiated from the front light 10 is maximized and the normal line of the exit surface 12b define an angle in the range of 1° to 10°. The light enters at an incident angle of 1° to 10° by the reflecting film 29 and is reflected by the reflecting film 29. The reflecting film 29 has the above-described reflection characteristic. Therefore, the direction in which the reflection light of the liquid crystal display device 1 is maximized is the direction of specular reflection of the incoming light. Accordingly, the range of the reflection light of the liquid crystal display device 1 is 1° to 10° with respect to the normal line of the display surface. Further, the range of 1° to 10° with respect to the normal line of the display surface substantially corresponds to the direction of the line of sight of the user, and thus the brightness of the liquid crystal display device 1 is substantially improved compared to the case where the known front light is used.

(Second Embodiment)

Figure 10:
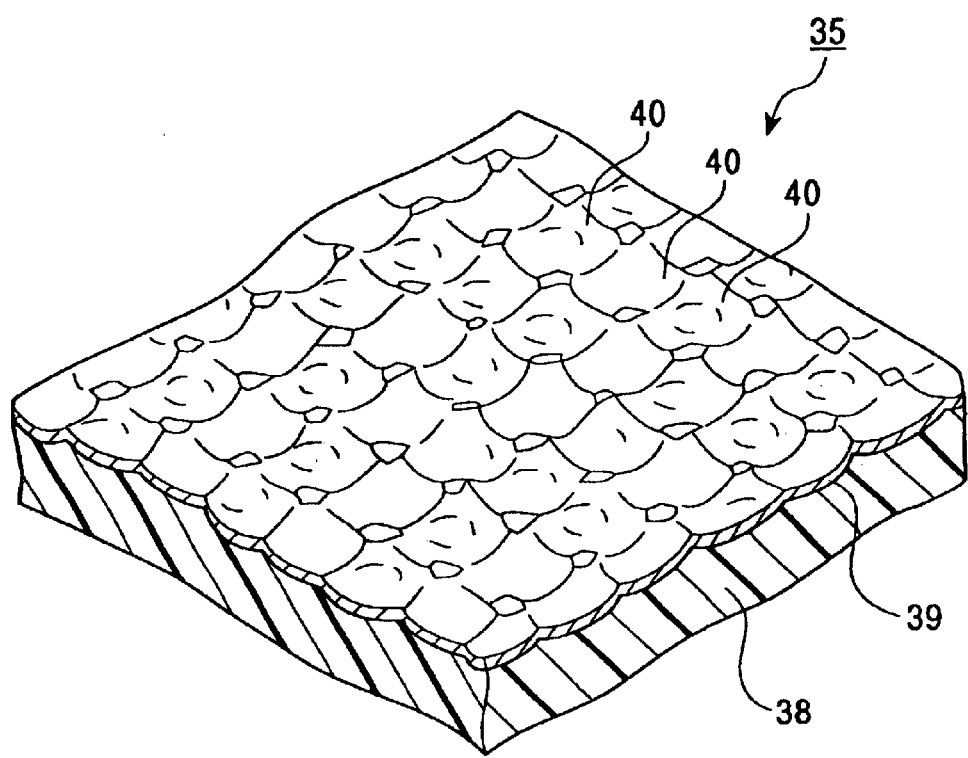
FIG. 10 is an enlarged perspective view of a part of the reflecting layer provided in a liquid crystal display device of a second embodiment of the present invention.

In the first embodiment, the reflecting layer 25, in which the straight line extending from the center O of the concavity 30 formed on the surface of the organic film 28 to the deepest point D of the concavity 30 is inclined with respect to the direction of the normal line of the organic film 28, as shown in FIGS. 5 to 7, is used. However, another reflecting layer having another configuration can be applied to the liquid crystal display device according to the present invention. Another configuration will be described below with reference to FIG. 10. A liquid crystal display device according to a second embodiment has the same configuration as that of the liquid crystal display device 1 shown in FIGS. 1 and 2, except for the configuration of the reflecting layer. That is, in the liquid crystal display device of this embodiment, a reflecting layer 35 shown in FIG. 10 is used instead of the reflecting layer 25 shown in FIG. 2. Hereinafter, only the configuration of the reflecting layer 35 will be described.

FIG. 10 is an enlarged perspective view showing a part of the reflecting layer 35 used in the liquid crystal display unit of this embodiment. In this figure, many concavities 40, each having a surface forming part of a sphere, are sequentially formed so as to partially overlap each other in the surface of the organic film 38. The reflecting film 39 is formed on the organic film 38.

The organic film 38 can be formed by evenly forming a resin layer comprising a photosensitive resin or the like on a substrate, pressing a transfer mold comprising an acrylic resin having a negative convex-concave surface with respect to the surface of the organic film 38 shown in FIG. 10 to the surface of the resin layer, and then by curing the resin layer. The reflecting film 39 is formed on the surface of the organic film 38 and reflects light entering the liquid crystal display unit 20. The reflecting film 39 can be formed by a metallic material having a high reflectivity, such as aluminum or silver, with a film-forming method such as sputtering or vacuum evaporation.

Preferably, the concavities 40 shown in FIG. 10 are randomly formed with a depth of 0.1 μm to 3 μm, are placed at a pitch of 5 μm to 100 μm, and the slope angle of the concavities 40 is set in the range of −30° to +30°.

It is particularly important to set the slope angle distribution of each concavity 40 to −30° to +30° and to set the pitch of adjoining concavities 40 randomly in all directions on the surface. The reason for this is that the reflection light becomes colored due to interference if the pitch of the adjoining concavities 40 is regular. Also, if the slope angle distribution of the concavities 40 is outside the range of −30° to +30°, the diffusion angle of the reflection light becomes too wide and the reflection strength is deteriorated, and thus a bright display cannot be realized. (When the diffusion angle of the reflection light becomes 36° or more in air, the reflection strength peak inside the liquid crystal display device drops, and the overall reflection loss becomes large.)

Further, when the depth of each of the concavities 40 surpasses 3 μm, the tops of the convexities cannot be covered with a planarizing film in the process performed later in order to planarizing the concavities 40, and thus a desired planarization cannot be obtained.

When the pitch of the adjoining concavities 40 is less than 5 μm, a number of problems arise due to constraints in manufacturing a transfer mold used for forming the organic film 38 including: an extremely long processing time is needed, the formation for obtaining a desired reflection characteristic cannot be achieved, and interference light is generated. Also, the transfer mold for forming the surface of the organic film 38 is made by transferring the surface form of a transfer mold matrix made by pressing many diamond indenters to a substrate comprising stainless steel to a silicone resin or the like. The diameter of the tip of the diamond indenters is desirably 30 μm to 200 μm for practical use, and thus the pitch of the adjoining concavities 40 is desirably 5 μm to 100 μm.

The liquid crystal display unit of this embodiment, which includes the reflecting layer having the above-described reflecting film 39, can reflect and scatter the light from the outside efficiently, and thus a bright reflection display and a wide viewing angle can be realized. This is because the depth and pitch of the concavities 40 shown in FIG. 10 are controlled in the above-described range and because the inner surface of each of the concavities 40 is spherical.

That is, since the slope angle of the concavity 40 controlling the reflection angle of light is controlled in a predetermined range by controlling the depth and pitch of the concavity 40, the reflection efficiency of the reflecting film 39 can be controlled in a predetermined range. Also, the surface of each of the concavities 40 is a sphere, which is symmetrical in every direction, and thus the above-described reflection efficiency can be obtained in every direction of the reflecting film 39. That is, brighter display can be achieved in every direction.

When the reflecting layer 35 having the above-described configuration is used and when the front light according to the present invention is used as a light source, the direction in which the amount of light radiated from the front light is maximized and the exit surface of the front light define an angle of 1° to 10°. Accordingly, the direction in which the amount of light reflected by the reflecting layer 35 is maximized also defines an angle of 1° to 10°. Consequently, the liquid crystal display device for realizing a bright display can be obtained by using the reflecting layer 35 according to this embodiment.

The technical scope of the present invention is not limited by the foregoing embodiments, and various modifications can be realized without deviating from the scope of the present invention. For example, the reflecting layer does not need to have a reflecting surface with many concavities, as in the reflecting layer 25 shown in FIG. 2: the reflecting layer can be formed by a flat metallic film. Also, a forward scattering panel can be provided on the outer surface of the second substrate 22 shown in FIG. 2.

EXAMPLES

Hereinafter, the present invention will be described in more detail with reference to examples in order to make the advantages of the present invention more clear. However, the present invention is not limited by the following examples.

First and Second Examples

Figure 11:
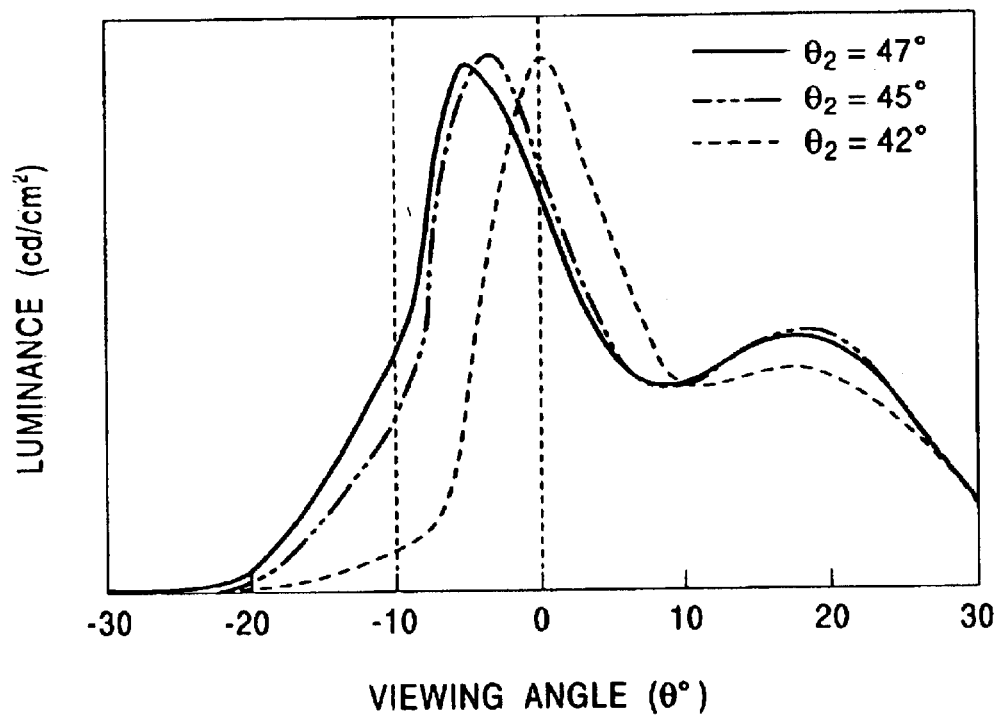
FIG. 11 is a graph indicating the relationships between the luminance and the viewing angle of surface light-emitting devices of first and second examples and a first comparative example.
Figure 12:
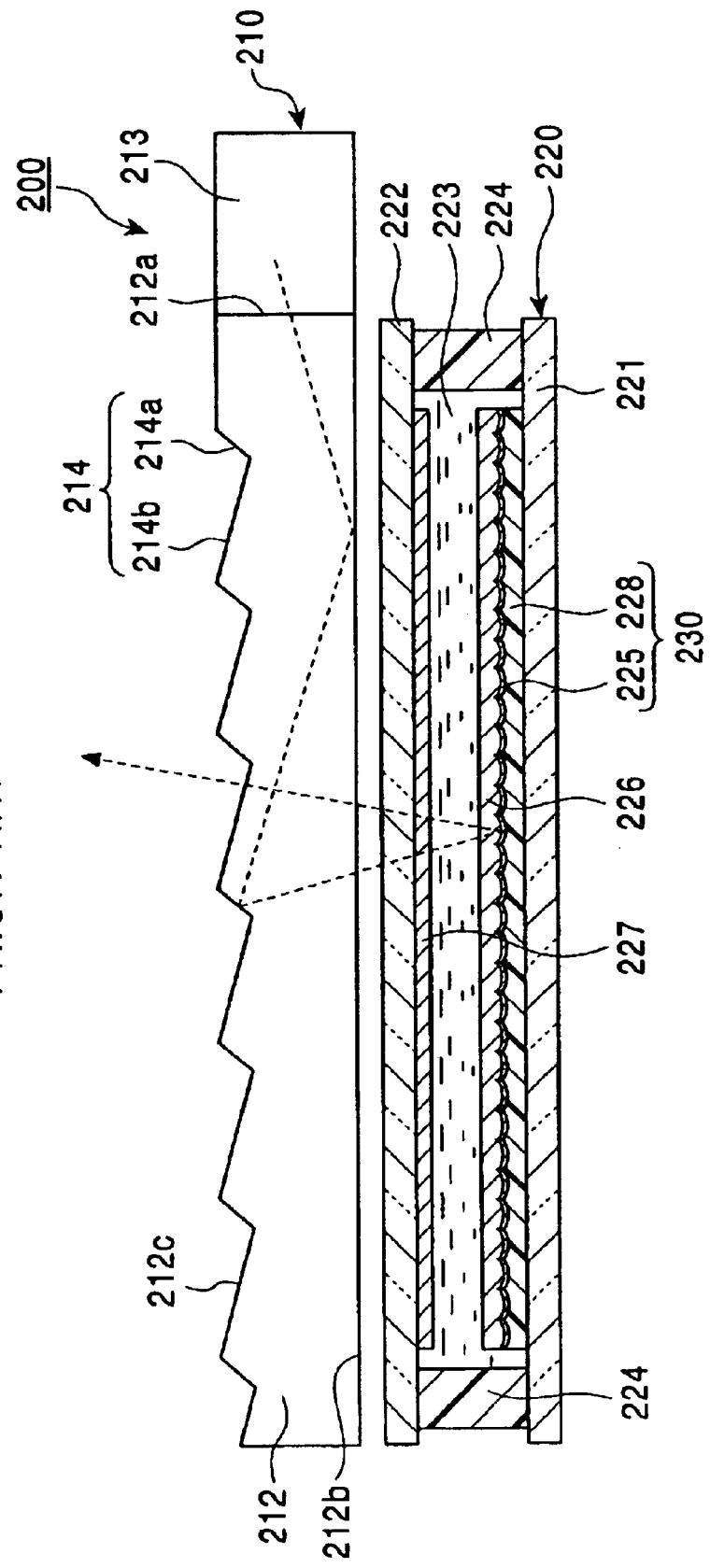
FIG. 12 is a sectional view showing an example of a liquid crystal display device including a known surface light-emitting device.
Figure 13:
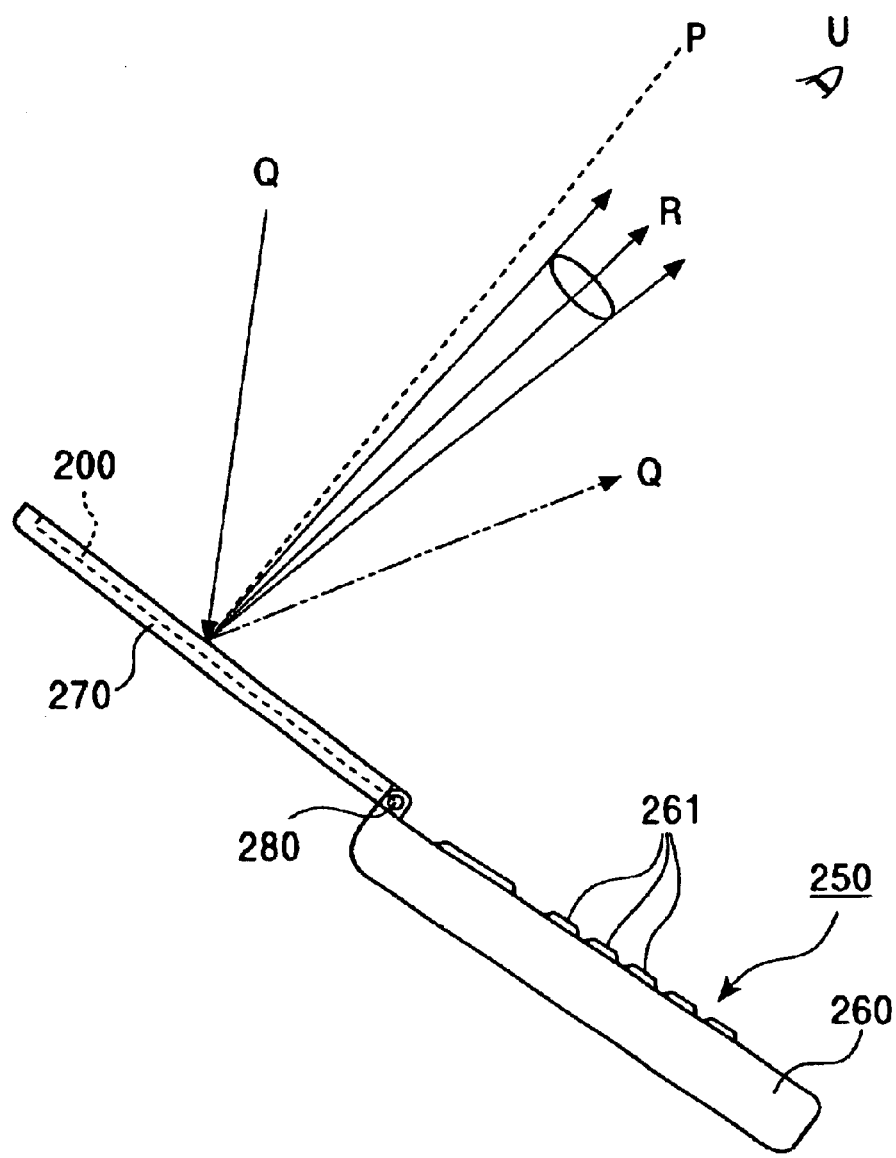
FIG. 13 is a side view showing an example of a mobile phone including the liquid crystal display device shown in FIG. 12.

In these examples, light guide panels having a reflecting surface provided with grooves at a pitch of PT including gentle slopes with a slope angle of $\theta_1$ and steep slopes with a slope angle of $\theta_2$ shown in the following table were made. Each of the light guide panels was a flat plate of 40 mm×50 mm×0.8 mm. Then, front lights were made by providing a bar-shaped light source on one end surface of each of the light guide panels. Then, the front lights were operated so as to measure the distribution of the amount of radiated light over the exit surface of each light guide panel. The measurement results are shown in FIG. 11. FIG. 11 shows the results obtained by measuring the luminance in the exit surface by changing the viewing angle in the range of −30° to 30°, with the normal line of the exit surface of the light guide panel being 0°. The horizontal axis indicates the viewing angle (θ°) and the vertical axis indicates the luminance (cd/m²).

As shown in FIG. 11, in the front lights according to the first and second examples which fulfill the requirements of the present invention, the direction in which the luminance is maximized is in the range of 1° to 10° with respect to the normal line of the exit surface. Here, light is emitted from the light guide panel toward the reflector (reflecting layer/film combination) in a specific range (here 1° to 10° with respect to the normal line of the exit surface) and impinges on the reflector at substantially the same angle. The reflector, in turn, concentrates the impinging light by reflecting this light at angles substantially between the specular reflection angle and the normal line of the surface of the reflecting layer parallel with the surface of the display or exit surface (i.e. between 1° to 10°). Note that the angles defined are magnitudes only. As FIG. 11 illustrates, the light emitted in an angular range of +(1° to 10°) is different from that emitted in a range of –(1° to 10°).

Thus, as shown in FIG. 11, the integrated intensity of light for a specific angular range that is substantially smaller than the entire range of display may be maximized over the most typical angular range used for viewing of the overall device. The entire range of display is defined as the range of display over which the luminescence emitted from the surface light-emitting device is substantially greater than 0% of the peak luminescence emitted from the surface light-emitting device. In FIG. 11, this range may start at, say, –20° for either the $\theta_2=47°$ or 45° curve. The integrated intensity over the specific angular range is also larger than that over any other angular range having the same angular width, i.e. in FIG. 11, the integrated intensity from 1° to –10° is larger than any other 9° range.

From these examples it can be seen that when either of the front lights of the first and second examples is provided on the front surface of a reflective liquid crystal display device, the direction in which the brightness of the liquid crystal display device is maximized is in the range of 1° to 10° with respect to the normal line of the display surface of the liquid crystal display device. Accordingly, the brightness in the direction substantially corresponding to the direction of the line of sight of a user can be enhanced.

|  | $\theta_2$ | $\theta_1$ | $P_T$ |
| --- | --- | --- | --- |
| Example 1 | 47° | 2° | 160 μm |
| Example 2 | 45° | 2° | 160 μm |
| Comparative Example 1 | 42° | 2° | 160 μm |

What is claimed is:

1. A surface light-emitting device comprising:
    a light source; and
    a light guide panel having a light incident surface provided on an end surface thereof to introduce light from the light source and an exit surface from which the light is radiated,
    wherein the light guide panel comprises a reflecting surface which faces the exit surface and which is provided with a plurality of grooves formed sequentially in a stripe pattern, each of the grooves having a gentle slope and a steep slope whose slope angle is steeper than that of the gentle slope, and
    the slope angle of the gentle slope is about 1.8° to 2.5°, a pitch of the grooves is about 140 μm to 240 μm, and the slope angle of the steep slope is about 43° to 47°.

2. A liquid crystal display device comprising the surface light-emitting device according to claim 1.

3. The liquid crystal display device according to claim 2, further comprising:
    a liquid crystal display unit including a pair of substrates sandwiching a liquid crystal layer,
    wherein the surface light-emitting device is provided on a front surface of the liquid crystal display unit,
    the liquid crystal display unit includes a reflector to reflect light from an outer side of one of the substrates, and
    a direction in which an amount of reflection light reflected by the reflector is maximized is about 1° to 10° with respect to the normal line of the liquid crystal display unit when the surface light-emitting device is in an on state.

4. The liquid crystal display device according to claim 3, wherein the direction in which the amount of reflection light reflected by the reflector is maximized is about 3° to 8° with respect to the normal line of the liquid crystal display unit when the surface light-emitting device is in the on state.

5. The liquid crystal display device according to claim 3, wherein the reflector has a surface provided with a plurality of reflective concavities formed irregularly and sequentially.

6. The liquid crystal display device according to claim 3, wherein the reflector is provided on a back side of the liquid crystal display unit.

7. The liquid crystal display device according to claim 3, wherein the reflector is incorporated into the liquid crystal display unit.

8. A surface light-emitting device comprising:
    a light source; and
    a light guide panel having a light incident surface provided on an end surface thereof to introduce light from the light source and an exit surface from which the light is radiated,
    wherein an integrated intensity of luminescence emitted from the surface light-emitting device in a specific angular range of about 1° to 10° with respect to a normal line of the surface light-emitting device is larger than that over any other angular range having the same angular width as the specific angular range.

9. The surface light-emitting device according to claim 8, wherein a direction in which an amount of light radiated from the exit surface of the light guide panel is maximized is about 1° to 10° with respect to a normal line of the exit surface.

10. The surface light-emitting device according to claim 9, wherein the direction in which the amount of reflection light reflected by the reflector is maximized is about 3° to 8° with respect to the normal line of the liquid crystal display unit when the surface light-emitting device is in the on state.

11. The surface light-emitting liquid device according to claim 8, wherein the light guide panel further comprises a reflecting surface which faces the exit surface and which is provided with a plurality of grooves formed sequentially in a stripe pattern with a pitch of about 140 μm to 240 μm, each of the grooves having a gentle slope of about 1.8° to 2.5° and a steep slope of about 43° to 47°.

12. The surface light-emitting device according to claim 8, further comprising a liquid crystal display unit including a pair of substrates sandwiching a liquid crystal layer and a reflector to reflect light from an outer side of one of the substrates, the surface light-emitting device provided on a front surface of the liquid crystal display unit, wherein the reflector concentrates impinging light by reflecting the impinging light at angles substantially between a specular reflection angle and the normal line of the exit surface.

13. The surface light-emitting device according to claim 12, the reflector comprising a surface provided with a plurality of reflective concavities formed irregularly and sequentially.

14. The surface light-emitting device according to claim 8, further comprising a liquid crystal display unit including a pair of substrates sandwiching a liquid crystal layer and a reflector to reflect light from an outer side of one of the substrates, the surface light-emitting device provided on a front surface of the liquid crystal display unit, wherein a direction in which an amount of reflection light reflected by the reflector is maximized is about 1° to 10° with respect to a normal line of the liquid crystal display unit when the surface light-emitting device is in an on state.

15. The surface light-emitting device according to claim 14, the reflector comprising a surface provided with a plurality of reflective concavities formed irregularly and sequentially.

16. A liquid crystal display device comprising:

a liquid crystal display unit including a pair of substrates sandwiching a liquid crystal layer therebetween and a reflector to reflect light from an outer side of one of the substrates; and a surface light-emitting device disposed on a front surface of the liquid crystal display unit, the surface light-emitting device including a light source and a light guide panel having a light incident surface provided on an end surface thereof to introduce light from the light source and an exit surface from which the light is radiated, wherein a direction in which an amount of light radiated from the exit surface of the light guide panel is maximized is about 1° to 10° with respect to a normal line of the exit surface and a direction in which an amount of reflection light reflected by the reflector is maximized is about 1° to 10° with respect to the normal line of the liquid crystal display unit when the surface light-emitting device is in an on state.

* * * * *

UNITED STATES PATENT AND TRADEMARK OFFICE
CERTIFICATE OF CORRECTION

PATENT NO. : 6,806,922 B2
DATED : October 19, 2004
INVENTOR(S) : Yoshihiko Ishitaka It is certified that error appears in the above-identified patent and that said Letters Patent is hereby corrected as shown below:

Column 14,
Line 55, after "light-emitting" delete "liquid".

Column 15,
Line 14, after "display unit," start a new paragraph with the words "wherein a".

Signed and Sealed this

Fifteenth Day of November, 2005

JON W. DUDAS
*Director of the United States Patent and Trademark Office*